(No Model.)
6 Sheets—Sheet 1.

W. LANG.
CASH REGISTER AND INDICATOR.

No. 520,853.   Patented June 5, 1894.

Fig. 1.

WITNESSES:
Charles Schroeder.
Marion Hall

INVENTOR
William Lang
BY
ATTORNEYS.

(No Model.) 6 Sheets—Sheet 2.

W. LANG.
CASH REGISTER AND INDICATOR.

No. 520,853. Patented June 5, 1894.

Fig. 2.

WITNESSES:
Charles Schroeder
Marion Hall

INVENTOR
William Lang
BY
Gorgas & Raegener
ATTORNEYS.

(No Model.) 6 Sheets—Sheet 4.

W. LANG.
CASH REGISTER AND INDICATOR.

No. 520,853. Patented June 5, 1894.

WITNESSES:
Charles Schroeder
Marion Hall

INVENTOR
William Lang
BY
Gorpel & Raegener
ATTORNEYS.

(No Model.) 6 Sheets—Sheet 5.

W. LANG.
CASH REGISTER AND INDICATOR.

No. 520,853. Patented June 5, 1894.

WITNESSES:
Charles Schroeder.
Marion Hall

INVENTOR
William Lang
BY
Goepel & Raegener
ATTORNEYS.

(No Model.) 6 Sheets—Sheet 6.
W. LANG.
CASH REGISTER AND INDICATOR.
No. 520,853. Patented June 5, 1894.

WITNESSES:
INVENTOR

UNITED STATES PATENT OFFICE.

WILLIAM LANG, OF BROOKLYN, NEW YORK.

CASH REGISTER AND INDICATOR.

SPECIFICATION forming part of Letters Patent No. 520,853, dated June 5, 1894.

Application filed May 19, 1892. Serial No. 433,640. (No model.)

*To all whom it may concern:*

Be it known that I, WILLIAM LANG, a citizen of the United States, and a resident of the city of Brooklyn, in the county of Kings and State of New York, have invented certain new and useful Improvements in Cash Registers and Indicators, of which the following is a specification.

This invention relates to an improved cash-indicator and register, by which the sales made in a store can be readily added up, so as to quickly and correctly produce the sum total of the sales, and by which the total amount of the sales is registered, so that the apparatus is adapted for stores, shops and business houses of all kinds, in which a large number of sales has to be added up and registered; and the invention consists of an improved cash-indicator and register, in which endless chains, provided with finger-rests, are used as the propelling medium in connection and guided between fixed counting bars, on which the figures from 1 to 9 are placed, said endless chains engaging sprocket-wheels, of which the hindmost sprocket-wheels transmit their motion by intermediate wheels, to totalizing wheels, the circumference of which is provided with the figures from 0 to 9. To the hub of each totalizing wheel are applied two eccentric cams, which are arranged on the same side of the wheel but diametrically opposite to each other and which serve to operate oscillating and spring-actuated levers by which the semi-rotation of each totalizing-wheel is transmitted to the adjacent wheel of the next higher order, so that the regular and reliable transmission of the semi-rotating of the units-wheel to the tens-wheel of the tens-wheel to the hundredths-wheel, &c., without danger of over-rotation is obtained. Each totalizing-wheel is further provided with a ratchet-wheel that is engaged by a spring pawl, so that a uniform resistance is exerted to the endless actuating-chains. The motion of each set of oscillating levers, operated by the eccentric cams on the hub of each totalizing-wheel, is transmitted to the next adjacent wheel by transmitting pawls that are operated by the oscillations of the lever, said pawls engaging ratchet-wheels on the totalizing-wheels of the next higher order. Vertically above the totalizing-wheels is arranged a series of indicating-wheels, which are connected with the actuating mechanism of the totalizing-wheels by intermediate transmitting gear-wheels, said indicating-wheels serving for indicating the amount of every sale that is to be added up by the totalizing-wheels. Each indicating-wheel is provided at its circumference with the figures from 0 to 9 and is applied loosely to a transverse shaft and returned to zero by the action of a coil-spring the inner end of which is attached to a fixed hub and the outer end to a stop pin on the indicating wheel. A lever mechanism operated from the front of the apparatus, permits the moving of the indicating-wheels and their shafts in lateral direction out of mesh with their transmitting gear-wheels, so that they are returned by their coil-spring until their stop-pins are arrested by fixed pins applied to a transverse stop-bar.

The invention consists, further, of certain details of construction and combination of parts, as will be fully described hereinafter and finally pointed out in the claims.

In the accompanying drawings, Fig. 3ª is a vertical transverse section on line 3ª 3ª, Fig. 3.

Similar letters and numerals of reference indicate corresponding parts.

Figures 3, 3A:
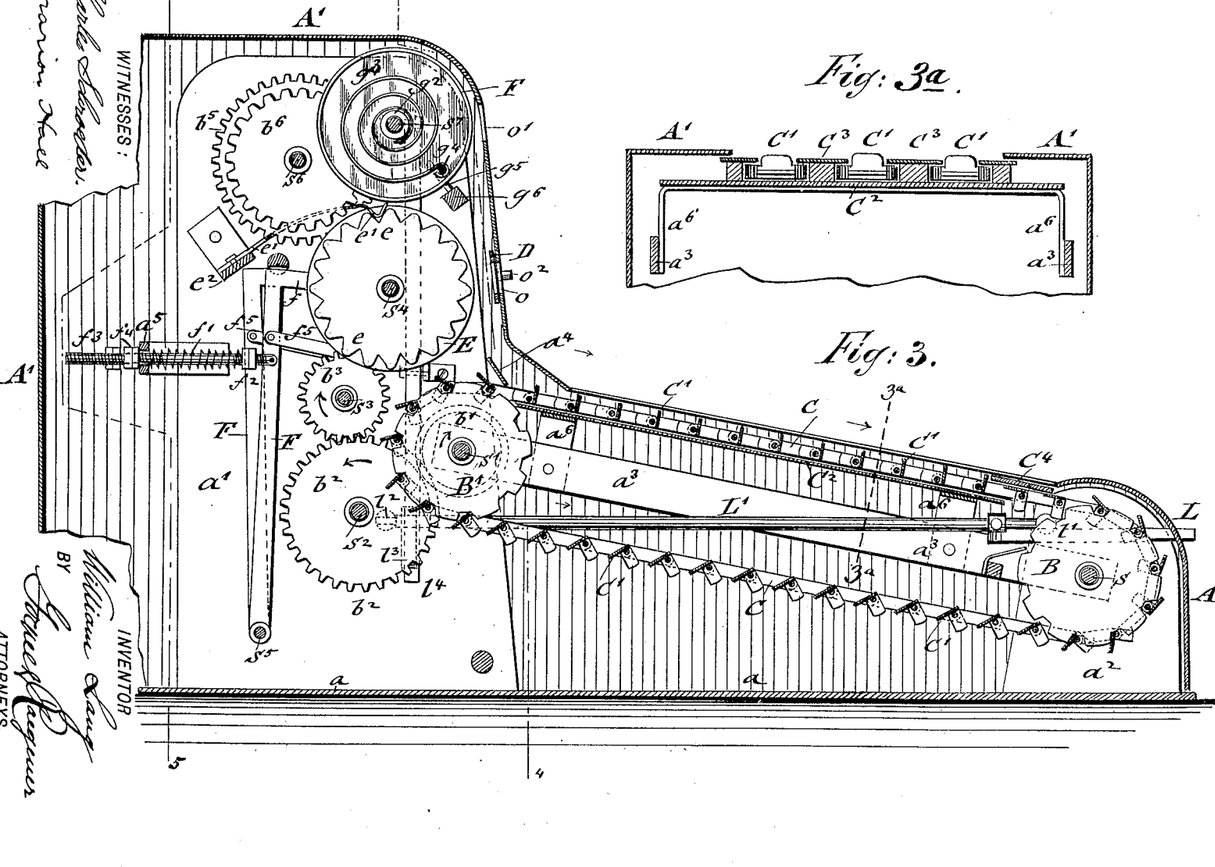
Fig. 3 is a vertical longitudinal section on line 3 3, Fig. 2.

Referring to the drawings, A represents the supporting frame of my improved cash-indicator and register, which supporting frame is composed of a base-plate $a$, two upright rear-plates $a'$ and two smaller upright front-plates $a^2$, which like the rear plates are screwed or otherwise attached to the base-plate $a$. The rear and front plates $a'$ $a^2$ are connected by side straps $a^3$, while transverse straps $a^4$, $a^5$ connect the front and rear ends of the rear plates, by which the supporting frame is firmly stiffened, so as to support the different shafts of the actuating mechanisms. The upright front plates $a^2$ support a fixed transverse shaft $s$ on which are loosely supported the hubs of a number of sprocket-wheels B. The rear plates $a'$, support likewise a fixed transverse shaft $s'$, to which are applied loosely the hubs of a corresponding number of sprocket-wheels B'. The sprocket-wheels B B' are connected by endless chains C, which are composed of pivot links, to the transverse pivots of which are applied by means of ears a number of finger-pieces C', which finger-pieces are guided along a fixed inclined plate $C^2$ that is attached to transverse straps $a^6$ of the supporting frame, as shown in Figs. 3 and 3ª. The sprocket wheels B B' engage the transverse pivots of the endless chains C, as the finger-pieces C' are moved over the inclined guide-plate $C^2$, the finger-pieces passing around the front sprocket-wheels and from the same to the rear sprocket-wheels and forward again over the inclined guide-plate $C^2$.

The endless chains C are arranged at a suitable distance from each other at the front part of the machine and are exposed to view through an opening in the inclined front part of a casing A' that incloses the entire apparatus. Between the endless chains C are arranged inclined stationary plates $C^3$, on which the figures from 1 to 9 are engraved or otherwise arranged, said figures being made in a sufficiently large size so as to be readily legible and arranged at such a distance from each other as to correspond to the distance between the finger pieces C'.

The sprocket-wheels B B' are provided with ten equi-distant recesses for the pivots of the endless chains C, so that when the chain is moved for the distance of ten finger-pieces, one rotation of the sprocket-wheels is produced. Across the lower ends of the indicator plates $C^3$ extends a fixed transverse plate $C^4$, which is provided with recesses $C^5$ which correspond in size with the projecting finger-pieces, said recesses indicating the zero-points of the indicator plates $C^3$ while the edges of the recessed plate $C^4$ serve for tilting over the finger-pieces, so as to pass below the plate $C^4$ onto the front sprocket-wheels B, as shown clearly in Fig. 3.

Figure 1:
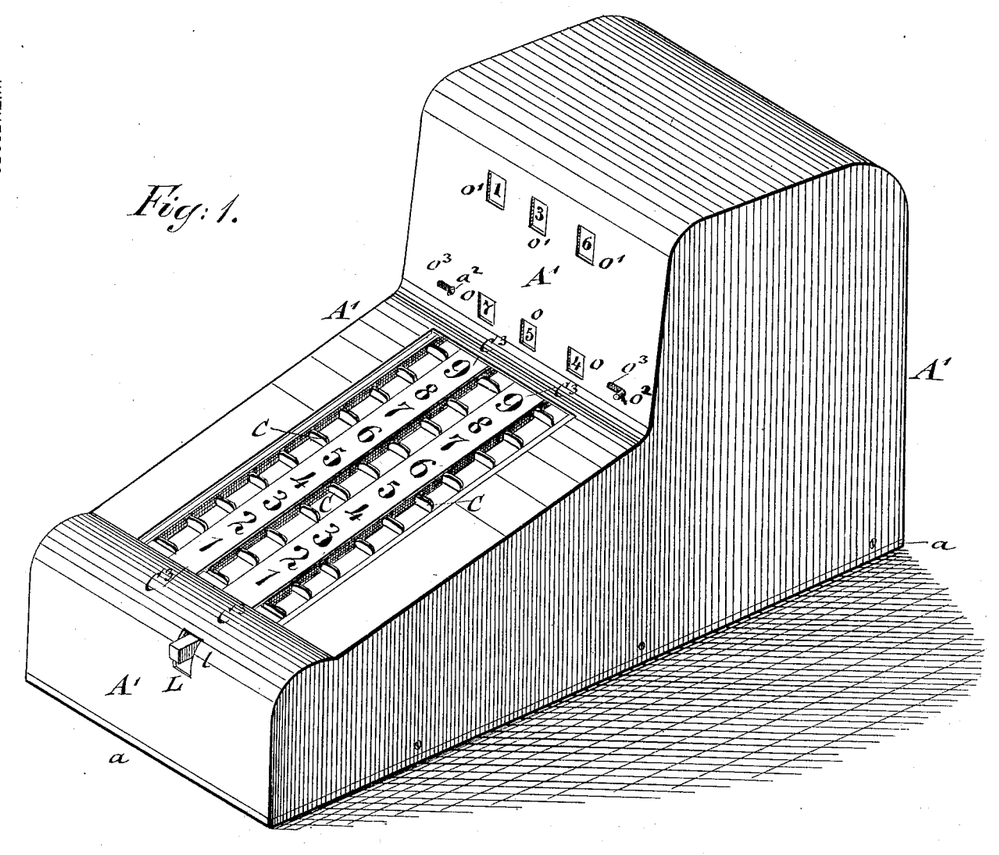
Figure 1 represents a perspective view of my improved cash-register and indicator.
Figure 2:
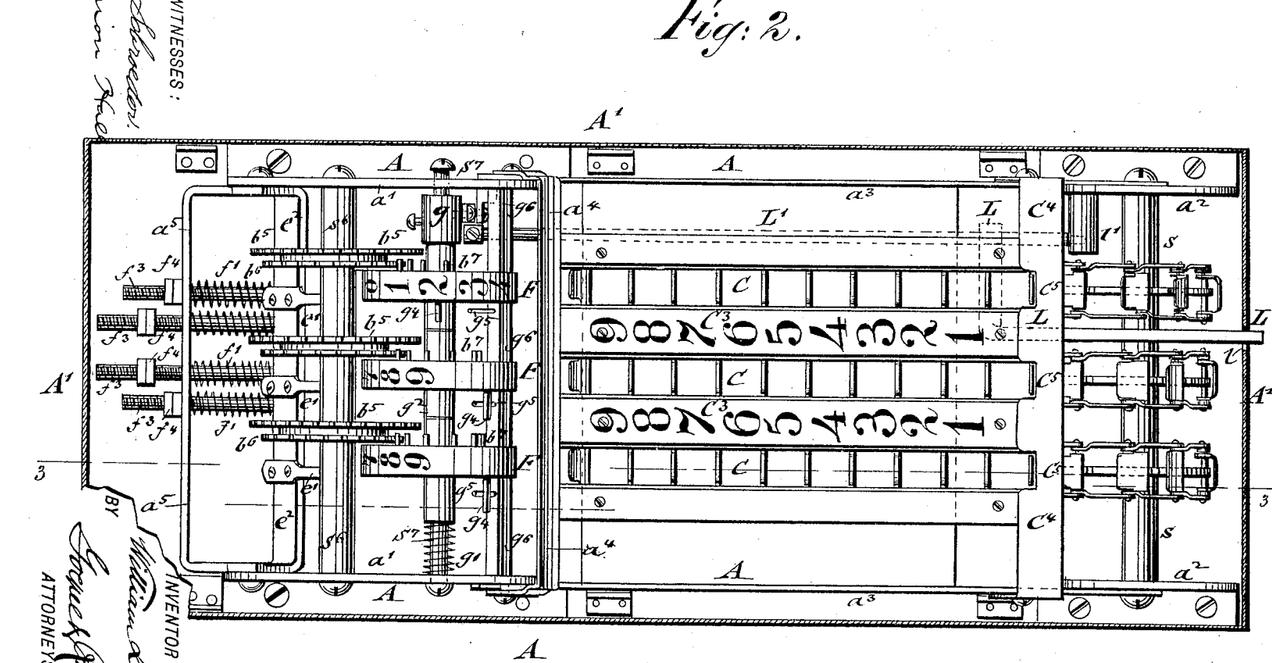
Fig. 2 is a plan view, showing the inclosing casing in horizontal section, said figure being drawn on a larger scale.

The casing A' is made of suitable sheet metal and attached by screws to the base-plate $a$ of the supporting frame A, it being made large enough so as to extend over the higher rear part of the machine. It is provided in the front wall of its higher rear-portion with a lower series of openings $o$ and with an upper series of openings $o'$, as shown in Fig. 1, the number of openings in each series corresponding to the number of endless chains employed in the machine. A slide-piece D is guided at the rear of the lower series of openings and provided with openings that register with the openings $o$ and with forwardly-projecting pins or studs $o^2$ that are guided in slots $o^3$ in the front wall of the casing D, so that the lower series of openings may either be closed by the slide-piece D, or the opening of the same placed in register with the openings $o$ of the casing, so as either to close the openings $o$ or open the same so as either to prevent the reading off of the figures on the registering or totalizing wheels or permit the reading off of the figures on the same as desired. By arranging a suitable locking-device (not shown in the drawings) in connection with the slide-piece D, the figures of the lower registering or totalizing wheels can be permanently covered, so that the party operating the machine cannot read off the figures on the same.

To the hub of each sprocket-wheel B' is keyed a gear-wheel $b'$, which meshes with an intermediate gear wheel $b^2$, that is placed loosely on the fixed transverse shaft $s^2$, supported by the rear-plates $a^3$. The gear-wheel $b^2$ meshes with a pinion $b^3$, which is placed loosely on a shaft $s^3$ that is supported likewise by the rear-plates $a^2$. The gear-wheel $b^3$ is provided with twenty teeth and placed in mesh with a gear-wheel $b^4$ that is loose on the hub of the registering or totalizing wheel E, which is loosely supported on a fixed transverse shaft $s^4$.

As many registering or totalizing-wheels E are arranged, as there are endless actuating chains, each registering wheel being rotated by its corresponding chain. Motion is communicated from the actuating chain through the gear wheels $b^2$ and $b^3$ to the loose wheel $b^4$. This loose wheel $b^4$ is disposed between the registering wheel E and the double ratchet wheel $f^8$ fixed on the hub of said registering wheel. A pawl $f^9$ on one face of the ratchet wheel $b^4$ engages the adjacent teeth of the double ratchet wheel $f^8$ and communicates motion from said wheel $b^4$ to said ratchet wheel $f^8$. The turning of this ratchet wheel on the hub of the registering wheel causes the turning of the registering wheel. The wheel $b^4$ is constantly in mesh with its actuating wheel $b^3$, which holds it in place during the carrying operation hereinafter described. The other portion of the double ratchet wheel $f^8$ is engaged by a pawl $f^7$ which constitutes a part of the carrying mechanism hereinafter described.

When the endless chain C is moved for the distance of ten figures, its corresponding registering-wheel E is moved for half a rotation. One half of the circumference of each registering wheel E is provided with the figures from 0 to 9 and the other half being likewise provided with these figures, said figures being seen through the openings $o$ in the front wall of the casing A'. To prevent the too easy motion of the registering-wheels, each wheel E is provided with a ratchet wheel $e$, the teeth of which are engaged by a spring check-pawl $e'$, said check-pawl exerting a retarding action on the registering-wheel E, without however impeding the easy motion of the actuating chains, the teeth of the ratchet wheel, as well as the engaging end of the spring check-pawl being rounded off for this purpose, as shown clearly in Figs. 3 and 6. The check-pawls $e'$ are attached to a transverse strap $e^2$ that is attached to the upright rear-plates $a^2$. To the hub of each registering-wheel E are applied two semi-circular cams E' which are arranged in diametrically opposite directions to each other, as shown in dotted lines in Fig. 6, the end of one cam being placed at the zero-point of the figures on the half of the circumference, while the end of the other cam is in line with the zero-point of the figures on the other half of the circumference of each registering wheel E. The circumference of each cam E' is placed in contact with a forward extending arm $f$ at the upper end of an oscillating lever F, the lower end of which is pivoted to a fixed transverse shaft $s^5$ supported by the upright rear plates $a^2$ of the supporting frame A. The end of the arm $f$ is held in contact with the cam $e^2$ by means of a helical spring $f'$ that is interposed between the rear strap $a^5$ and a collar or nut $f^2$ on a guide rod $f^3$, which is pivoted to the oscillating lever F and guided in the openings of the rear strap $a^5$, as shown clearly in Figs. 2, 3, 6, 7 and 8. The guide-rod $f^3$ is provided with a nut and jam-nut $f^4$ at the rear of the guide-strap $a^5$, said screw-nuts being so adjusted as to control thereby the extent of forward motion of the oscillating lever F and prevent too great a friction between the end of the arm $f$ and the circumference of the cam E'. The oscillating-lever F of each cam E' is connected by a pivot rod $f^5$ with an angle lever $f^6$ that is placed loosely on the transverse shaft $s^4$ of the registering-wheels E, said angle lever carrying at its opposite end a fixed spring pawl $f^7$ that engages a ratchet wheel $f^8$ on the hub of the next adjacent registering wheel E as shown in Figs. 7, 8, 10 and 11. A second ratchet wheel $f^8$ is arranged sidewise of the first ratchet wheel both being keyed to the hub of the registering wheel E, as shown clearly in Figs. 8 and 9 so that the pawls operated by the oscillating lever F engage one ratchet-wheel $f^8$ while the second ratchet-wheel $f^8$ is engaged by the pawl $f^9$, attached to the gear wheel $b^4$, said pawl preventing the ratchet wheel $f^8$ from turning in opposite direction to that imparted by the pawls $f^7$ and serving also to transmit motion to said ratchet wheel from the wheel $b^4$ and the actuating chain as hereinbefore described. The ratchet wheel $f^8$ hereinbefore referred to as a double ratchet wheel may be constructed in one piece as a single ratchet wheel having teeth of a sufficient breadth to permit the pawls $f^9$ and $f^7$ to pass each other, a central rib being preferably provided to prevent contact of these pawls.

By the mechanism described the motion of one half of the circumference of the first or units wheel E is transmitted by one cam E' and its carrying mechanism to the next adjacent or tens wheel E, and the motion of the other one half circumference of the first or units wheel is also transmitted by the second cam, E' and its carrying mechanism the next adjacent or tens wheel E and so on to the registering wheels of the next higher order. This has the advantage that by the quick working of the actuating chains and the intermediate transmitting mechanism the rotations of the first or units wheel are reliably transferred to the second or tens wheel and counted by the same without any skipping over-rotation of the wheel by a too great speed of operation of the machine. The same carrying mechanism is arranged for transmitting the motion from the second or tens wheel to the third or hundredths wheel, and from the same to the wheel of the next higher order if such a one is used.

Figure 4:
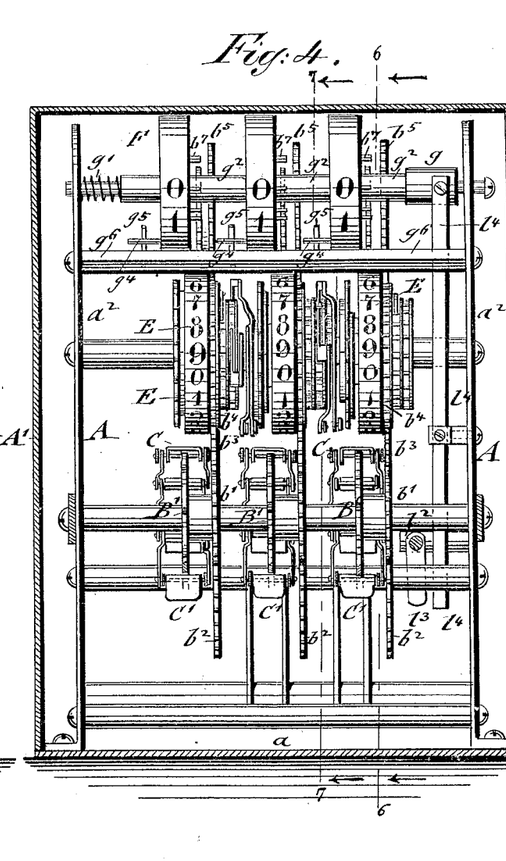
Figs. 4 and 5 are respectively a front elevation and a rear elevation of the totalizing and indicating mechanisms, the inclosing casing being drawn in vertical section in these figures.
Figure 5:
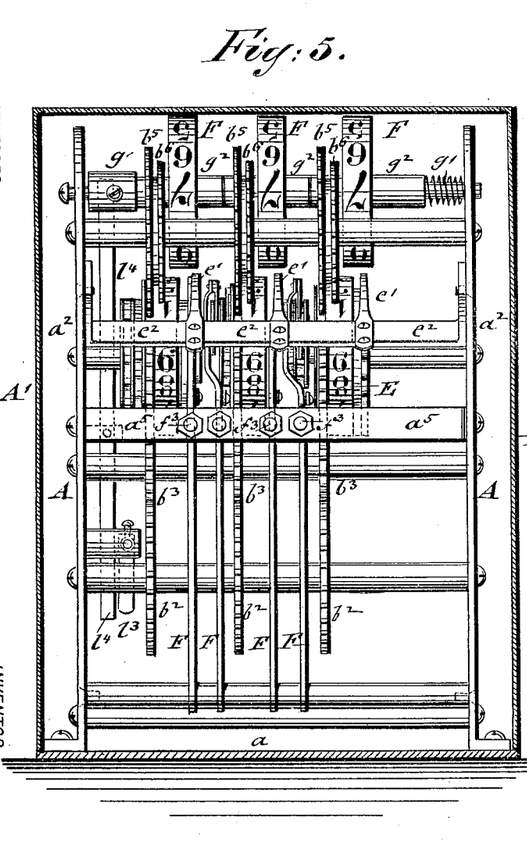
Figures 6, 7:
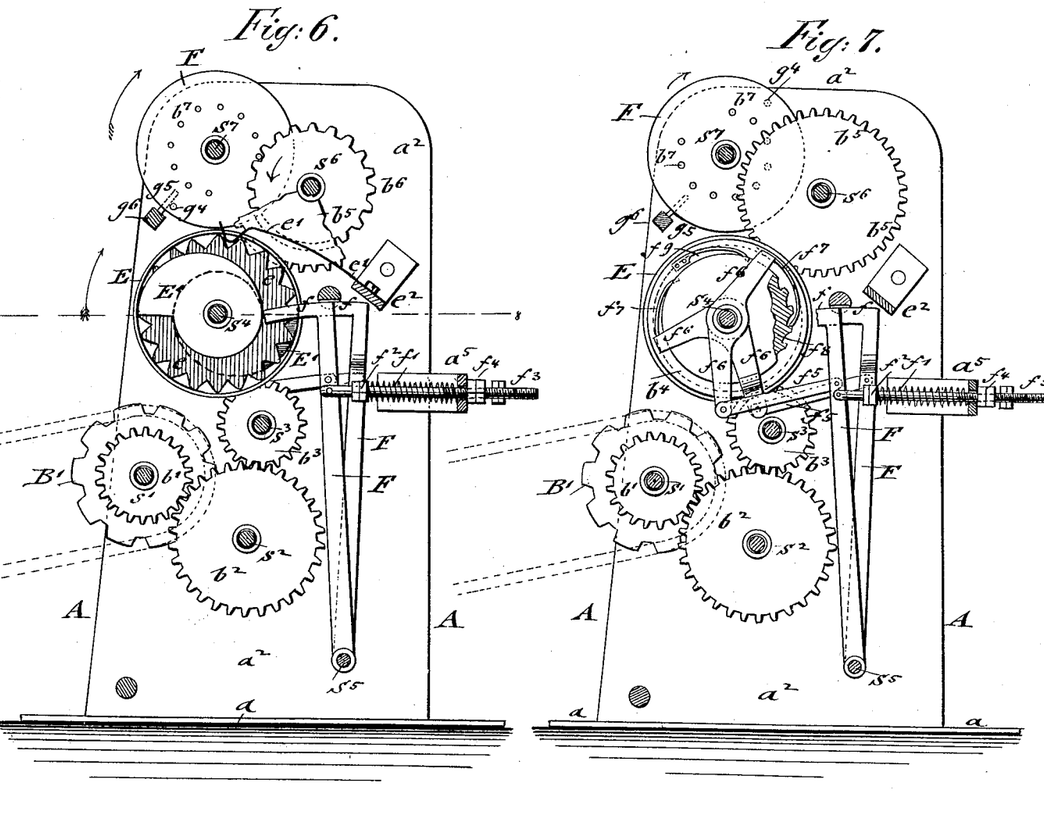
Figs. 6 and 7 are vertical transverse sections, respectively on lines 6 6 and 7 7, Fig. 4, said sections being taken in direction of the arrows, shown in said figures.
Figures 8, 9, 10, 11:
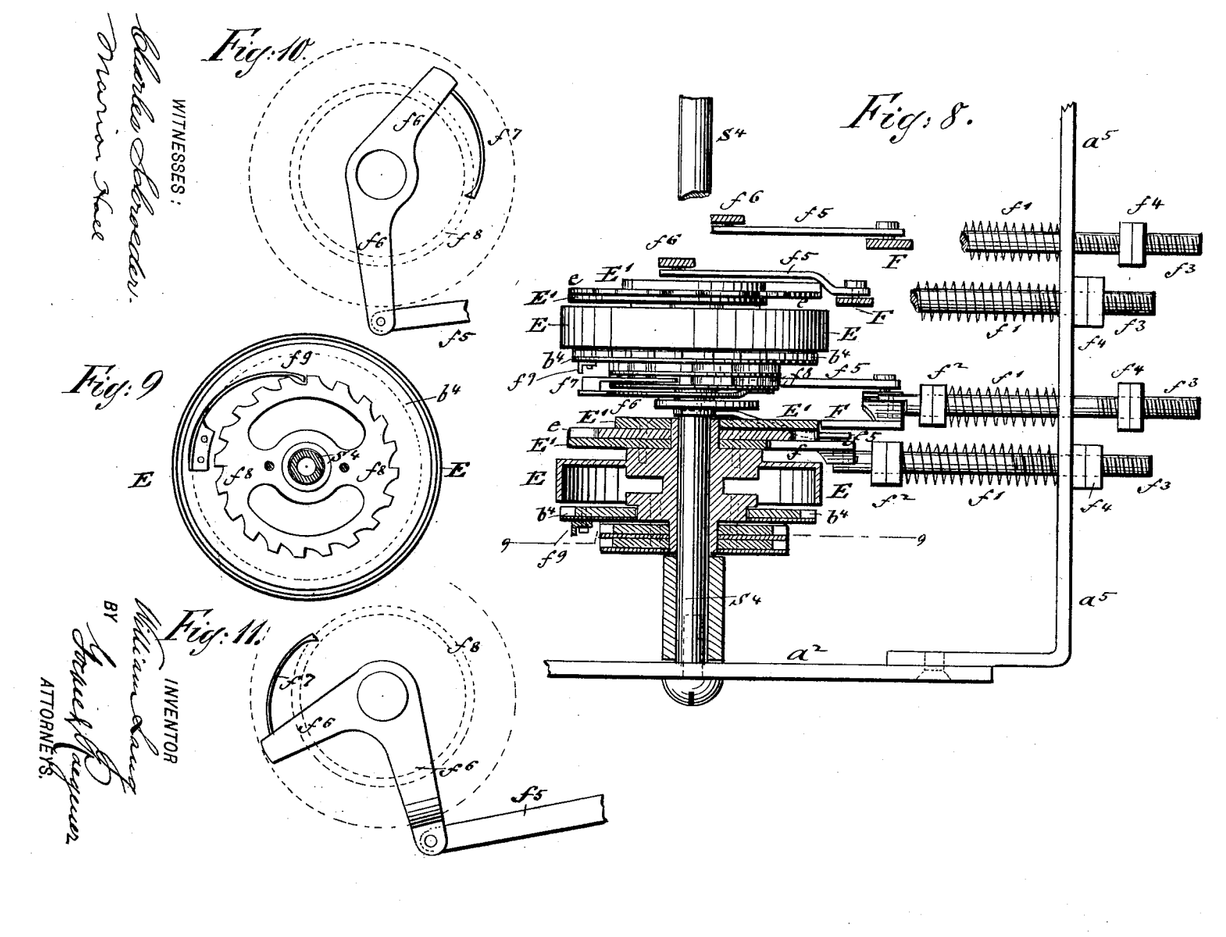
Fig. 8 is a sectional plan of the totalizing wheels and the carrying mechanism between the same, drawn on a larger scale.
Figs. 9, 10 and 11 are details of the carrying mechanism by which motion is transmitted from one totalizing wheel to the adjacent wheel of the next higher order.

The actuating mechanisms of the totalizing wheels E transmit rotary motion to the gear wheels $b^4$ arranged loosely in the hub of the totalizing wheels, and by intermediate gear wheels $b^5$ $b^6$ arranged on a fixed shaft $s^6$ to projecting and stationary pins $b^7$ on a corresponding number of indicating wheels F which are placed loosely on a transverse shaft $s^7$ that is supported at the upper part of the supporting rear plates $a^2$. The shaft $s^7$ is arranged so that it can be shifted in lateral direction in the bearings of the rear plates $a^2$, a fixed sleeve $g$ being attached to one end of the shaft adjacent to the hub of the first indicating wheel F, while a helical spring $g'$ is interposed between the hub of the last indicating wheel F and the opposite rear plate $a^2$. Between the hubs of the indicating wheels F are arranged fixed collars $g^2$ on the shaft $s^7$ as shown clearly in Figs. 2, 4 and 5. Each indicating wheel F is provided at one side with projecting pins $b^7$ that intermesh with the transmitting gear-wheel $b^6$ and at the other side with a spiral spring $g^3$, the inner end of which is attached to a fixed collar $g^2$ on the shaft $s^7$ while the outer end is attached to a pin $g^4$ near the circumference of the wheel F, said spiral or coil-spring serving for storing up power and returning the indicating wheel to the zero-point, after the different figures of a number are set and before the figures of the next number to be added are set off by the endless chains. The axial rotation imparted to the indicating wheels F by the transmitting gear-wheel sets also the coil spring of the same the required degree of tension, until the indicating wheels are to be returned to zero, which is accomplished by shifting the shaft $s^7$ with the entire set of indicating wheels F from the right toward the left, by which motion the pins $b^7$ on the wheels F are moved out of mesh with the transmitting gear-wheels $b^6$, so that the indicating wheels F can be returned by their spiral springs to the zero-point, that is, turned on their axis, until the laterally projecting pins $g^4$ to which the outer ends of the coil springs $g^3$ are attached, are arrested by the upwardly projecting detents or stop-pins $g^5$ of a fixed transverse bar $g^6$, that is attached to the upper part of the upright rear plates $a^2$, as shown clearly in Figs. 2, 3 and 4. The lateral shifting motion by which the indicating wheels F are enabled to return to zero, is accomplished by an angular arm L, that projects through an opening $l$ at the front part of the casing A', as shown in Fig. 1, said arm being keyed to an oscillating rod L' which is supported in bearings $l'$ $l^2$ and provided at its rear end with a downwardly projecting finger $l^3$ that engages the lower end of a fulcrumed upwardly extending lever $l^3$, which is pivoted at its upper end to the fixed sleeve $g$ on the shaft $s^7$, so as to move the latter against the tension of the helical spring $g'$ in lateral direction. The indicating wheels F serve as monitors, so as to indicate whether the different numbers are correctly set off by the actuating chains. After all the figures of a number are set off and correctly indicated by the figures on the different indicating wheels F, the lever L is depressed and by the intermediate laterally shifting mechanism the indicating wheels F returned to zero. As soon as the lever L is released, the helical spring $g'$ shifts the shaft $s^7$ and returns the indicating wheels F on the same into mesh with their transmitting gear-wheels, so that they are again in a position to be acted on by said gear wheels for indicating figures of the next number set off by the machine. Should by inadvertence the lever L not be operated preparatory to setting off the next number on the machine, the indicating wheels F would be turned until the blank space that is left on their circumference between the figures 0 and 9 appears through the opening of the shell or covering. As a gap is left between the pins $b^2$ corresponding to the space between the figures 0 and 9, or the circumference of the indicating wheels, as shown clearly in Figs. 6 and 7, the transmitting gear-wheels cannot turn the indicating wheels beyond the figure 9, as there are no more pins for meshing with the teeth of said gear-wheels, consequently, the indicating wheels will vibrate on their shaft, without being axially turned thereon. The failure to return the indicating-wheels F to zero therefore does not exert any injurious or interfering action on the machine at all, as the rotating registering wheels will continue to act in the same manner as before.

My improved cash-register and indicator is operated as follows: The numbers to be added are set off on the machine preferably by starting with the right-hand side or units-chain and working the chains from right to left, setting off every figure of a number. It is not absolutely necessary to operate the machine from right to left, as it can be also operated with the same facility from left to right, it being perfectly immaterial in which order the actuating chains are operated. After each number is set off by the endless chains and has been added up on the registering wheels B, the figures shown on the indicating-wheels are compared with the figures of the number just added, so as to ascertain whether they are correct. If the figures tally, the lever L is depressed, and thereby the indicating wheels shifted out of gear with their transmitting gear-wheels, so that they are returned by their coil-spring to zero. As soon as the lever is released, the spiral spring acting on the shaft of the indicating-wheels, returns the latter to intermesh with their motion-transmitting gear-wheels, so that the indicating-wheels are ready to respond again to the next motion of the actuating chains and indicate the figures of the next number set off on the machine. Owing to the reliable action of the transmitting cams, levers and pawls operated by the registering wheels, over-rotation of the latter is avoided, even when the machine be worked at high speed, which can be readily done, as the chains can be moved by the finger-pieces between the guide-bars with great rapidity. The adding up of bills can thus be accomplished in a very quick and reliable manner, so that the machine is specially adapted as an adding machine for stores of all kinds, while the totalizing wheels indicate the total amount of the sales made.

Having thus described my invention, what I claim as new, and desire to secure by Letters Patent, is—

1. The combination of a series of totalizing wheels, a corresponding series of actuating chains, transmitting mechanisms between the chains and the totalizing wheels, carrying mechanism for transmitting motion from a totalizing wheel of the lower order to a totalizing wheel of the next higher order, a corresponding series of indicating wheels movable independently of the totalizing wheels, and mechanism for transmitting motion from the actuating mechanism of the totalizing wheels to the indicating wheels, said indicating wheels being in continuous connection by intermediate transmitting mechanism with the actuating mechanism of the totalizing wheels, substantially as set forth.

2. The combination, with a series of endless actuating chains, of a series of totalizing wheels transmitting mechanism between the actuating chains and the totalizing wheels, two cams extending in diametrically opposite directions, located on the hubs of the totalizing wheels, oscillating and spring actuated levers operated by said cams, ratchet wheels on the hubs of the totalizing wheels, oscillating angle levers, connected by pivot links with the oscillating levers and spring pawls on the opposite ends of the angle levers, said pawls engaging the ratchet wheels of the adjacent totalizing wheels of the next higher order, substantially as set forth.

3. The combination with a series of endless actuating chains, of a series of totalizing wheels, mechanism for transmitting motion from the actuating chains to the totalizing wheels, a series of indicating wheels, transmitting mechanism between the actuating mechanism of the totalizing wheels and the indicating wheels, each indicating wheel being actuated by a spiral spring, mechanism for shifting the indicating wheels laterally out of mesh with their transmitting mechanism, and a stop-device for arresting the axial motion of the indicating wheels, substantially as set forth.

4. The combination, with a series of endless actuating chains, having finger pieces for moving the same, of a series of totalizing wheels, mechanism for transmitting motion from the actuating chains to said totalizing wheels, a series of indicating wheels transmitting gear wheels between the totalizing and indicating wheels, said indicating wheels being actuated by spiral springs, a spring actuated shaft; on which the indicating wheels are supported and a lever mechanism for shifting the shaft so that the indicating wheels are moved out of mesh with their motion, transmitting gear-wheels and returned into their initial or starting positions, ready for the next actuation, substantially as set forth.

5. The combination, with a series of actuating chains, of a series of totalizing wheels, actuated by said chains, a series of indicating wheels, motion transmitting mechanism between the registering and indicating wheels, spiral springs attached to the said indicating wheels, fixed stops for arresting the return-motion of the indicating wheels, a laterally shiftable shaft on which the indicating wheels are supported, a lever-mechanism for laterally shifting said shaft and the indicating wheels on the same so as to move them out of mesh with their transmitting mechanism and permit their axial motion until arrested by the fixed stops, and a return spring acting on the shaft, so as to return the same and the indicating wheels into mesh with their transmitting mechanism, substantially as set forth.

6. The combination, of the indicating wheels, a laterally shiftable shaft for supporting the same, spiral springs applied to said indicating wheels, said springs being set to tension when the wheels are axially rotated, fixed stops for said indicating wheels, a sleeve secured to one end of the shaft, a helical spring acting on the other end of said shaft, a fulcrumed lever pivoted to the fixed sleeve, an oscillating finger adapted to engage the lower end of said fulcrumed lever, an axially turning rod supported in suitable bearings, and a forward-extending lever for turning said rod and shifting thereby the shaft and the indicating wheels in lateral direction, substantially as set forth.

In testimony that I claim the foregoing as my invention I have signed my name in presence of two subscribing witnesses.

WILLIAM LANG.

Witnesses:
PAUL GOEPEL,
CHARLES SCHROEDER.